(12) United States Patent
Creijghton et al.

(10) Patent No.: US 8,025,781 B2
(45) Date of Patent: Sep. 27, 2011

(54) METHOD AND MEANS FOR CHEMICALLY MODIFYING GASES OR FUMES

(75) Inventors: Yves Lodewijk Maria Creijghton, Annastraat (NL); Timo Huijser, Zoetermeer (NL); Coen van Gulijk, Delft (NL); Franciscus Petrus Thomas Willems, Breda (NL); Johan Oonk, Apeldoorn (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 80 days.

(21) Appl. No.: 11/569,465

(22) PCT Filed: May 9, 2005

(86) PCT No.: PCT/NL2005/000346
§ 371 (c)(1),
(2), (4) Date: Aug. 20, 2007

(87) PCT Pub. No.: WO2005/113114
PCT Pub. Date: Dec. 1, 2005

(65) Prior Publication Data
US 2008/0138266 A1    Jun. 12, 2008

(30) Foreign Application Priority Data
May 24, 2004 (EP) .................................. 04076517

(51) Int. Cl.
*C23F 28/00* (2006.01)
(52) U.S. Cl. .......................... 204/482; 204/276; 422/906
(58) Field of Classification Search ........................ None
See application file for complete search history.

(56) References Cited

U.S. PATENT DOCUMENTS
6,007,681 A * 12/1999 Kawamura et al. ........... 204/164
6,641,786 B2 * 11/2003 Hall et al. ................ 422/186.04
7,025,939 B1 * 4/2006 Hall et al. ................ 422/186.04
7,070,744 B2 * 7/2006 Son .......................... 422/186.04
(Continued)

FOREIGN PATENT DOCUMENTS
DE         43 17 964 A1    12/1994
(Continued)

OTHER PUBLICATIONS
International Search Report, Aug. 2005.

*Primary Examiner* — Melvin C Mayes
*Assistant Examiner* — Sheng H Davis
(74) *Attorney, Agent, or Firm* — Leydig, Voit & Mayer Ltd.

(57) ABSTRACT

Method and means for modifying gases or fumes fed through a filter (1), from its inlet side to its outlet side, submitted to an electric plasma having its maximum plasma density (d) at the filter's inlet side. The gases or fumes may comprise $NO_x$, the filter being constituted by a catalytic material fit for modifying $NO_x$. The filter also may be polluted with e.g. a soot deposit, precipitated on the filter's surface and/or within the filter's interior. The means may comprise a first electrode system (2) at the filter's inlet side and a second electrode system (3) at the filter's outlet side, connected to a high voltage (V1). Preferably the first electrode system comprises two or more groups of interlacing electrodes, each connected to a high voltage source (V1, V2, V3).

19 Claims, 6 Drawing Sheets

U.S. PATENT DOCUMENTS

2005/0249024 A1 * 11/2005 Bhattacharyya ............. 365/232

FOREIGN PATENT DOCUMENTS

| EP | 1086740 | * | 9/2000 |
| EP | 1 086 740 A2 | | 3/2001 |
| EP | 1086740 | * | 3/2001 |
| GB | 2316691 | * | 8/1996 |
| GB | 2 316 691 A | | 3/1998 |
| WO | WO 01/61161 A1 | | 8/2001 |

* cited by examiner

METHOD AND MEANS FOR CHEMICALLY MODIFYING GASES OR FUMES

FIELD OF THE INVENTION

The invention refers to a method and means for chemically modifying gases or fumes, e.g.—not exclusively—exhaust gases or fumes generated by combustion engines like diesel engines, which gases or fumes are fed through a filter.

BACKGROUND OF THE INVENTION

The use of an electrical plasma for chemical conversion of ingredients—like $NO_x$ (NO, $NO_2$, . . . ), coal, soot etc.—of exhaust gases is known from various (patent) publications since about 1994.

In presence of water and/or oxygen the plasma produces strongly oxidizing radicals such as OH, HO2, O and negative ions of O2. It has also been shown by chemical kinetics calculations (R. Dorai, J. Appl. Phys. Vol 88, No. 10, 2000) that electron impact dissociation of hydrocarbons in exhaust gases contributes to the total concentration of oxidizing compounds.

In order to apply plasma's for soot and/or NOx conversion, gas permeable dielectric filter materials have been proposed in an interelectrode gap. Examples of these materials are packed pellet beds and ceramic foams with a variety of main pore sizes. These materials are essential for either collection of materials such as soot particles, dust particles or particles containing living micro-organisms (the collection may be mechanical or electrostatically enhanced) or because of their catalytic properties.

A number of attempts have been made to convert both soot particles and NOx in a single plasma reactor. However, because in electrical plasma's NO is readily oxidized to NO2, and soot oxidation by NO2 reproduces NO, segmented approaches have been investigated too. According to the segmented approaches, soot is filtered and converted by plasma in a first segment, and the remaining NOx concentration is further treated by plasma in a second segment, preferentially in presence of a catalyst.

For soot conversion, different filter and electrode configurations have been proposed. In wall-flow type plasma filters, e.g. proposed by S. Müller et al. (Hakone Conference, Greifswald, 11-13 Sep. 2000), the filter pore size is sufficiently small to collect the main particle mass at the filter surface. In the so called flow-through filter type, the particles are collected within a ceramic packed bed or within a relatively open ceramic foam where the main pore size is large compared to the particle size. A plasma filter of this type has been proposed by AEA Technology in patent WO00/71866.

For optimization of NOx conversion, plasma reactors have been proposed with relative large non-gas permeable electrodes, where at least one of the electrodes is covered by a dielectric barrier coated with catalytic material. Examples of this type of reactors are published in patents (e.g. US2001/0040089 of Delphi Technologies).

A drawback of existing wall-flow plasma filters is that either the plasma's cause smaller particles that are either not filtered or the filter pore size causes an unacceptable pressure drop. Flow-through plasma filters suffer from relatively large filter thickness requirements and inhomogeneous plasma distribution. An important drawback of existing plasma reactors in general, for both soot and NOx conversion, is their high energy consumption. For automotive applications an extra fuel consumption of 2-4% for generating the electrical plasma may be acceptable. However, the electrical plasma power at this given fuel consumption is unsufficient for effective conversion of soot and NOx using the known plasma reactors.

SUMMARY OF THE INVENTION

The present invention aims to improve the conversion process in making it more efficient and effective.

One aspect is to generate a plasma in an e.g. dielectric filter material, through which the gases are fed from its inlet side to its outlet side, having a time-averaged plasma energy density (briefly: plasma density) that is inhomogeneous in the direction of the flow through the filter and maximal at the filter's inlet side.

A plasma density distribution with a high plasma density region at the filter's inlet side, and a relatively low plasma density in the main part of the total filter volume, is beneficial for efficient soot and/or NOx conversion.

An essential part of the mass of soot particles, in the form of relatively large particles, is effectively treated in the high plasma density region at the filter inlet side. The soot particles, generally having a fractal structure, will be fragmented in smaller ones by both plasma oxidation and/or plasma induced pressure waves. The relatively small particles will be effectively trapped in the filter volume where the plasma density is relatively low, and are effectively oxidized at minimal energy cost.

Also for NOx conversion, a relatively small region with high plasma density at the filter inlet side, is advantageous. In the high plasma density region, fast radical reactions are used to convert NO to NO2, while in the comparatively large volume with low plasma density the (comparatively) slow catalytic conversion of NO2 to N2 is sustained by a relatively low radical production. Separating the region with high density plasma conversion of NO to NO2 from the region with relatively low density plasma sustainment of catalytic reduction of NO2 to N2, effectively limits conversion of NO2 back to NO.

The electric field, causing the plasma having the preferred non-homogenous density across the filter in its flow direction may be generated by applying an electric field between a first electrode system at the filter's inlet side and a second electrode system at the filter's outlet side. Preferably, the first electrode system comprises one or more electrodes having a dielectric barrier and the second electrode system comprises an electrode having a mainly flat over-all shape. A dielectric barrier may be formed by an dielectric coating or cover around the relevant electrodes, preventing undesired thermal discharges. The second electrode system may have a mainly flat over-all shape, comprising a plurality of relative sharp electrodes to encourage the forming of a rather regular pattern of (more or less parallel) discharges between both electrodes, together building the desired plasma.

One single high voltage source may be connected between the electrodes of the first electrode system and those of the second electrode system. The plasma density will be maximal in the vicinity of the first group of electrodes which are covered with dielectric barriers. A drawback might be that, as there is no electrical field between the individual electrodes of the first electrode system, no of little plasma will be formed there.

To improve this, preferably an (additional) electrical field between the individual electrodes of the first electrode system may be generated in order to increase plasma forming at the filter's inlet side and thus to increase its effectiveness. In a preferred embodiment, in which the first electrode system comprises a first group of electrodes and the second electrode system a second group of electrodes, the first electrode system, moreover, comprises a third group of electrodes which may be interlaced between the first group of electrodes. A high voltage is applied between the first and second group of electrodes, at either side of the filter, and between the first group of electrodes and the third group of electrodes, at the filter's inlet side. A high voltage may be applied between the third and the second group of electrodes, at either side of the filter too. Applying a high voltage between the third and the second group of electrodes may be additional to applying a high voltage between the first and the second group of electrodes or may replace the latter.

It is preferred that per pair of electrode groups between which a high voltage is applied, the electrodes of one or both of those paired electrode groups are covered by a dielectric barrier, to prevent direct (thermal) discharge between those electrodes. Consequently, of the first pair of electrode groups, formed by the first and third group of electrodes, both situated at the filter's inlet side, the electrodes of the first or the third group of electrodes or both of them have to be covered by a dielectric barrier. Also of the second pair of electrode groups between which a high voltage is applied, situated at the filter's both sides, viz. the first and second group of electrodes, the electrodes of those first or second group of electrodes or both have to be covered by a dielectric barrier. And, finally, of the third pair of electrode groups between which a high voltage is applied, situated at the filter's both sides, viz. the third and second group of electrodes, the electrodes of those third or second group of electrodes or both have to be covered by a dielectric barrier.

DETAILED DESCRIPTION OF THE DRAWINGS

Figure 1:
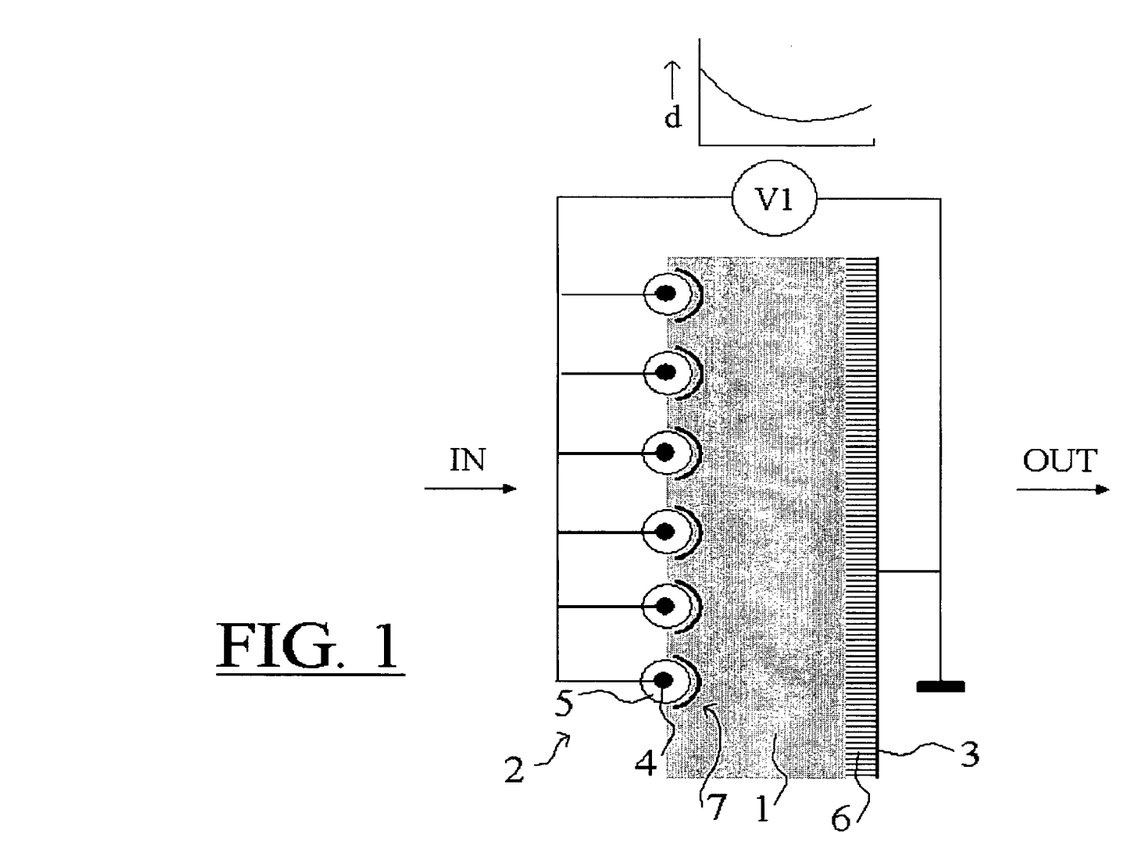
FIG. 1 shows a first preferred embodiment of a system for performing the method as presented above.

FIG. 1 shows a filter 1 of e.g. a ceramic foam, to be used for chemically modifying gases fed from its inlet side ("IN") to its outlet side ("OUT"). The filter is part of a system that, besides, comprises means for submitting the filter to an electric plasma having a plasma density that is maximal at the filter's inlet side.

The gases, fed to the filter's inlet side, may comprise soot particles while the filter pore sizes are sufficiently small for precipitation of particles at the filter surface and/or in the filter's interior and the system may be fit for (plasma-chemically) cleaning the filter that is polluted with such a deposit. The gases may also comprise $NO_x$, e.g. NO and/or $NO_2$, while the filter material may contain a catalytic material fit for modifying NO and/or $NO_2$ into $N_2$ or a liquid or solid N-compound like e.g. a foam made by $Al_2O_3$.

Figure 2:
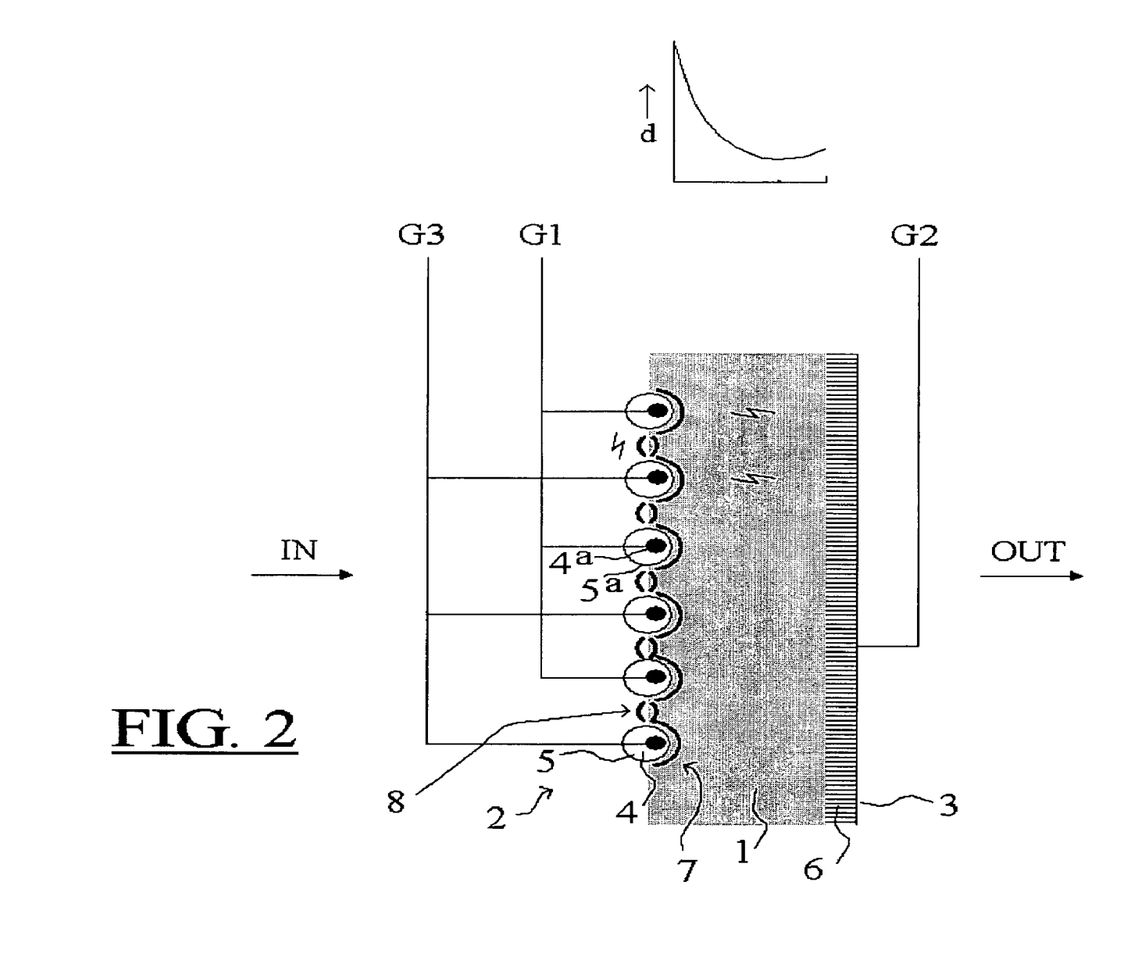
FIG. 2 shows a second preferred embodiment of such a system.

The means for submitting the filter to an electric plasma having a plasma density that is maximal at the filter's inlet side may comprise a first electrode system 2 at the filter's inlet side and a second electrode system 3 at the filter's outlet side. In the embodiments of FIGS. 1 and 2 the first electrode system comprises several electrodes 4 having a dielectric barrier (e.g. a ceramic coating or cover) 5. The second electrode system is formed by an electrode 3 having a mainly flat over-all shape. The second electrode system 3 preferably comprises a plurality of relative sharp sub-electrodes 6. Although the electrode 3 has a mainly flat over-all shape, the plurality of relative sharp sub-electrodes 6 achieve a rather homogenous distribution of the starting points of the (micro) discharges at a moderate (high) voltage applied between electrode systems 2 and 3.

In the embodiment of FIG. 1 a high voltage V1 is applied between all electrodes 4 of the first electrode system 2 and the electrodes 6 of the second electrode system 3. The source of V1 may be an AC high voltage source, preferably generating alternating high voltage pulses which facilitate a simultaneous formation and spatial distribution of a large number of microdischarges between the relevant electrode systems. The plasma density distribution (d) has been graphically represented in the graph at the top of the figure. As a consequence of the dielectric barriers covering the separated, e.g. tubular, oval or rectangular shaped electrode bars at the filter's inlet side, the plasma density is maximal (see arrow 7) at that inlet side. Preferentially the filter material has a shape such that the contact surface between the dielectric barriers 5 and the filter material 1 is as large as possible. This can be achieved by using a large number of cylindrical dielectric barrier electrodes which are partly embedded in the filter material.

FIG. 2 shows an embodiment in which the first electrode system 2 comprises two groups of mutually interlacing electrodes, one group (the first group of electrodes) comprising electrodes 4, covered by an dielectric barrier 5, and an electrode group (the third group of electrodes) comprising electrodes 4a, covered by dielectric barriers 5a. The three electrode groups 4, 4a and 6 are pairwise connected to a high voltage, indicated by V1, V2 and V3. Those high voltages V1, V2 and V3 may be originated in different ways. For instance the terminals G1 and G2 may be connected to a voltage source generating V1, the terminals G3 and G2 to a voltage source generating V2, and the terminals G1 and G3 to a third voltage source generating V3. The third voltage V3 may, alternatively, be generated by the voltage sources generating V1 and V2 if those both voltage sources have mutual different momentary voltages, resulting in the voltage V3 between the terminals G1 and G3. Applying V3 between the terminals G1 and G3 results in an additional plasma (indicated by arrow 8) between the electrodes 4 and 4a at the filter inlet, improving the filter's effectiveness. Besides an increased plasma density within the filter 1 at its inlet side, the voltage V3 will cause a better distribution of the plasma density in the direction perpendicular to the main direction of the gas flow. Preferentially the thickness of the dielectric barrier 5 covering the electrodes of electrode groups 4 and 4a, is smaller at the side of the filter material 1 than at the side of the incoming gas flow. As a consequence the plasma will be concentrated in the part of filter material 1 that has a boundary with the dielectric barrier 5 (see arrow 7). The dielectric barrier thickness variation is preferably achieved by using a dielectric barrier (5) having a cylindrical shaped internal surface (covering the internal electrodes) and an oval or elliptical external surface.

Depending on the shape, dielectric constant and porosity of the filter material 1 at the filter inlet side, a surface discharge along the filter's inlet surface may be generated. This surface discharge (see arrow 8) will clean up the surface of the filter 1 from the soot etc. that has been deposited at that surface. For surface discharge cleaning of soot particles a filter material having at the filter inlet a small typical pore size and constituted by a material with high dielectric constant (e.g. $BaTiO_3$) is preferred. The plasma density distribution again has been represented at the right top side of FIG. 2.

Figure 3:
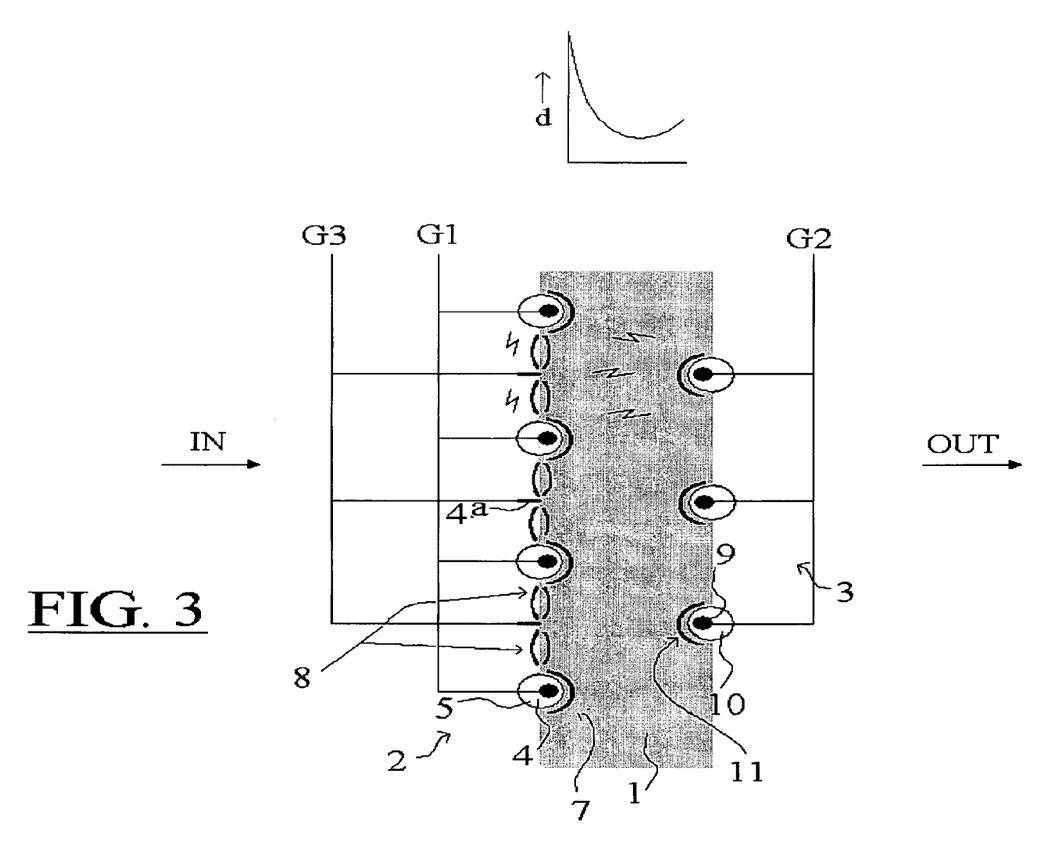
FIG. 3 shows a third preferred system embodiment.

FIG. 3 shows another embodiment in which the first electrode system 2 comprises two groups of interlacing electrodes. The electrodes 4 of one electrode group (the first group of electrodes) are covered by a dielectric barrier 5 while the electrodes 4a of the other electrode group (the third electrode group) are not covered by a dielectric barrier, but have a sharp electrode structure. The electrodes 9 (the second group of electrodes) forming the second electrode system 3, at the filter's outlet side, are covered by a dielectric barrier 10 in this embodiment. The result is a high density plasma 7 around the electrodes 4 due to the voltage V1 between the electrodes 4 of the first electrode group and the electrodes 9 of the second group, as well as a high density plasma 8 between the electrodes 4 and the electrodes 4a due to the voltage V3 applied between the electrodes 4 and the electrodes 4a. Besides, a plasma concentration 11 will be present around the electrodes 9, covered by barriers 10, due to the voltage V2 between the electrodes 4a and 9, increasing the plasma density at the filter's outlet side (see also the density distribution at the figure's top).

Figure 4:
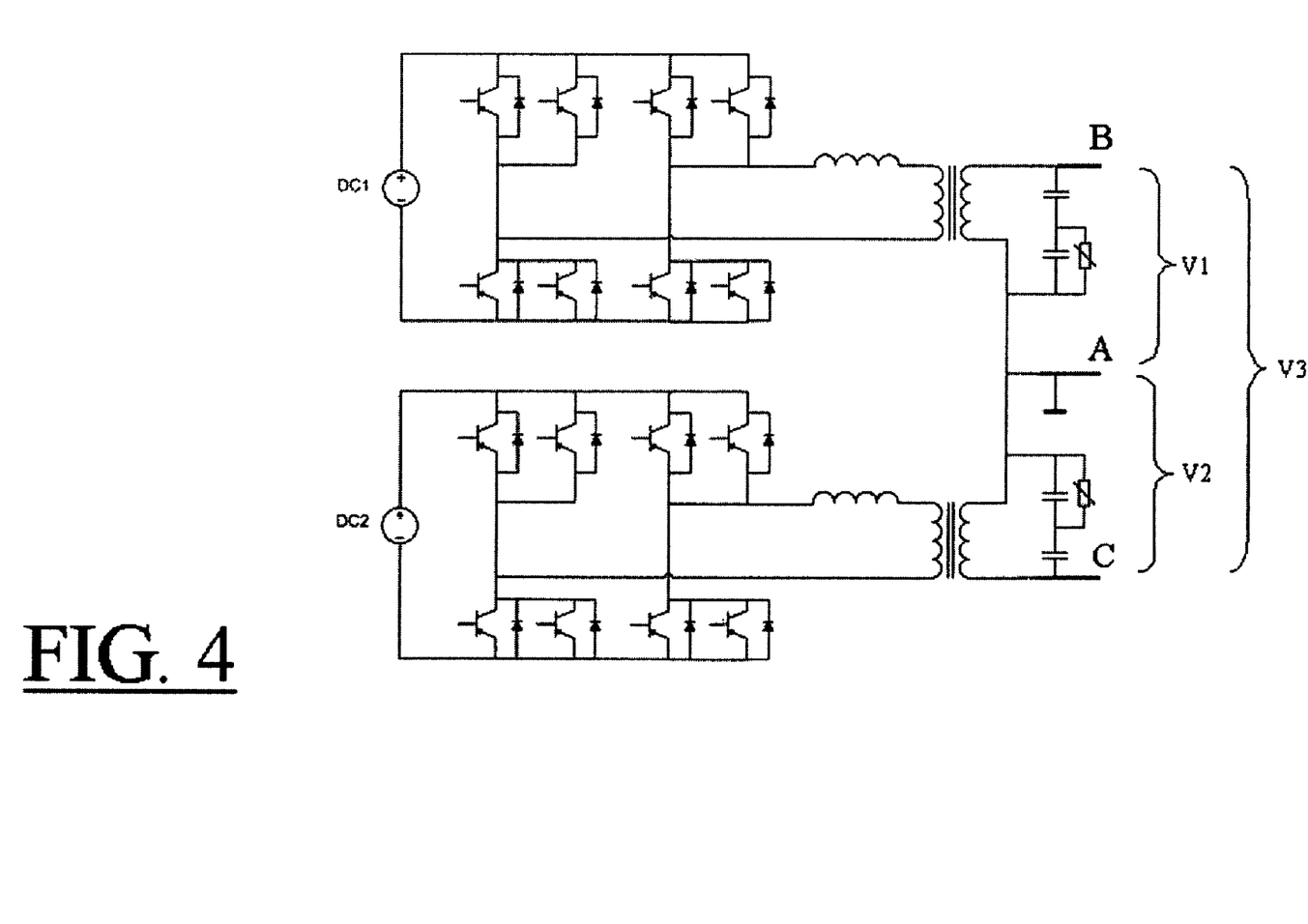
FIG. 4 shows an example of a dual high voltage source.

FIG. 4 shows an example of an electronic high voltage source that can be used to supply two independent high voltages, viz. a voltage V1 between terminals A and B and a voltage V2 between terminals A and C. Those voltages V1 and V2 have mutual different momentary voltages and are thus enabled to supply a voltage V3 between the terminals B and C (V3=V1−V2). Terminal A may be connected to terminal G2 in the FIGS. 2 and 3, terminal B to terminal G1 and terminal C to terminal G3.

The circuit presented in FIG. 4 uses two identical high voltage pulse transformers having a common ground potential and V1 and V2 as high voltage outputs. The primaries of the transformers are fed with two identical so called H bridge circuits. The four branches of each bridge can be opened or closed using semiconductor switches such as IGBT's. To generate alternating voltage pulses, the switches are used to apply current pulses through the transformer primary turns with alternating current direction. Momentary voltage differences between V1 and V2—resulting in V3—can be generated by a controllable momentary phase shift between the repetitive trigger pulses that open and close the H bridge circuits 1 and 2.

Separation of the first electrode system 2 into two or more electrode groups (G1, G3), fed by different voltage sources also results in a reduction of the electrical capacitance per voltage source. This reduction of the capacitance greatly facilitates the generation of high frequency AC voltages or fast rising high voltage pulses. A short voltage rise time and/or a short pulse duration have a positive effect on microdischarge distribution and energy efficiency.

Figure 5:
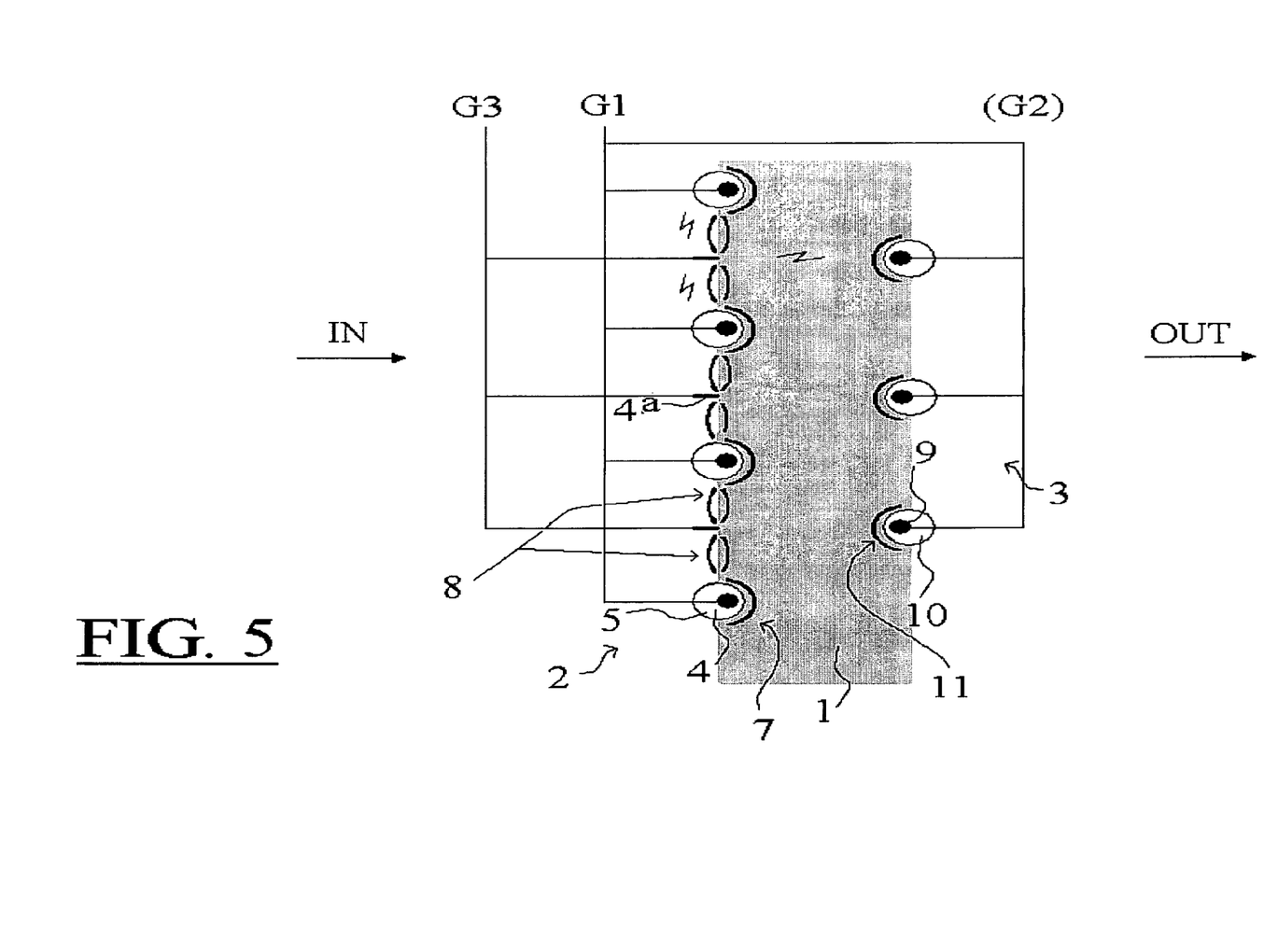
FIG. 5 shows a fourth preferred system embodiment.

FIG. 5 shows an embodiment which is identical to the embodiment of FIG. 3. The difference is that the terminals G1 and G2 are mutually interconnected. Due to that V1 is zero and V2 may be equal to V3 (compare FIG. 3). The terminal G3 (connected to the non-covered electrodes 4a at the filter's inlet side) may be connected to ground potential. The terminals G1 and G2 (connected to the covered electrodes at both sides of the filter) may be connected to a single high voltage source. First a high density plasma 8 may be formed by between the electrodes 4a and the electrodes 4 (covered by dielectric barrier 5) and the high density plasma region will also extend to the dielectric barrier surface region at the boundary with the porous filter material 1 (indicated by arrow 7). The plasma will further extend in the direction of electrode system 2 and cause a low plasma density region in the interior part of filter material 1.

An advantage of this figure's embodiment is that it can be electrically fed by a single voltage source, only generating one voltage, instead of two or more phase shifted voltages. The amount of plasma energy in the filter's interior per applied voltage pulse depends on the electrical capacitance between electrode group 3 and electrode group 2 and may be further controlled by limiting the length of high voltage pulses. Since the time needed for plasma formation between electrode groups 3 and 2 is larger than the time needed for plasma formation between electrode groups 3 and 1 (due to the finite propagation velocity of microdischarges) the length of short high voltages pulses can be used to control the amount of the plasma energy in the filter's interior.

Figure 6:
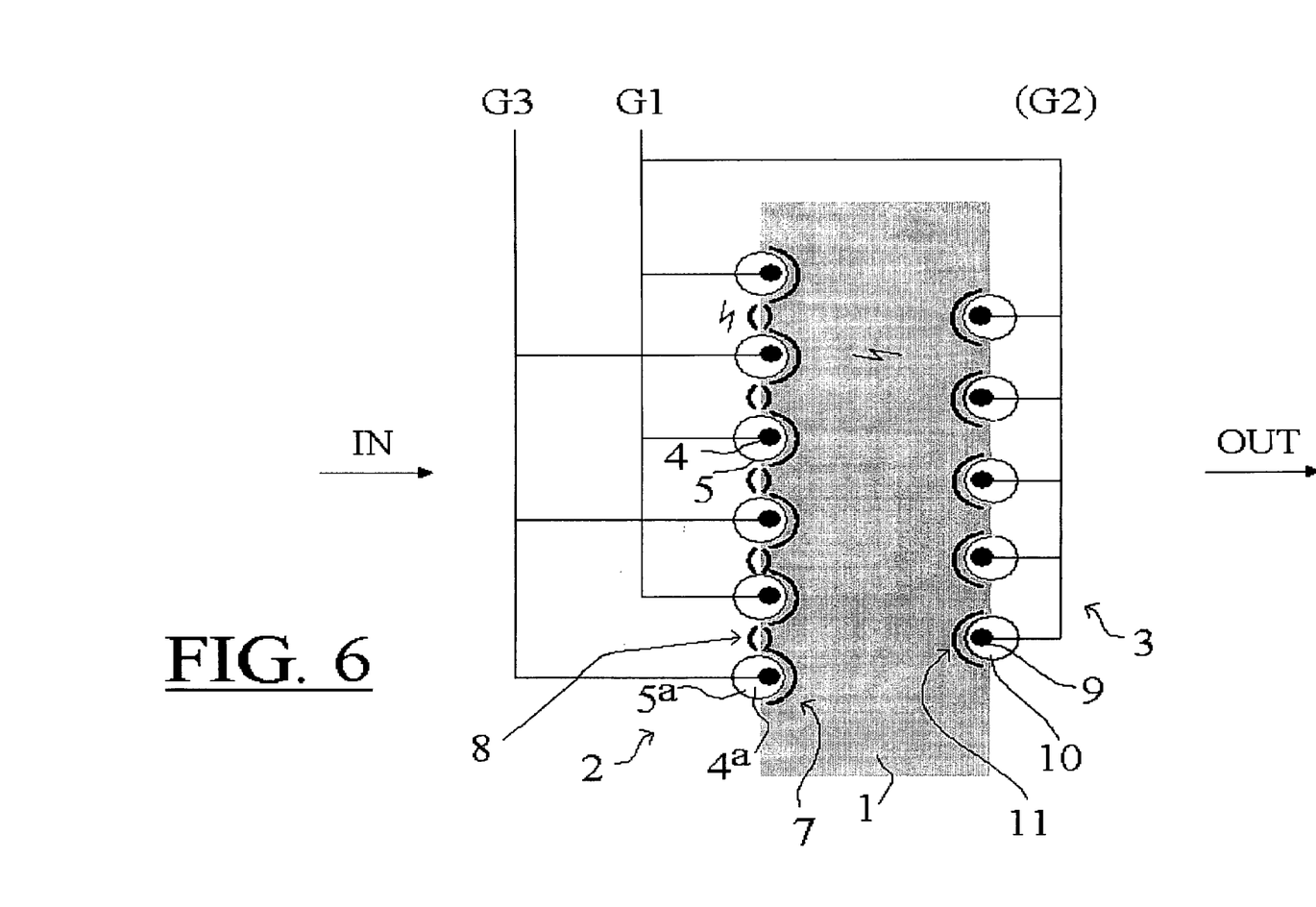
FIG. 6 shows a fifth preferred system embodiment.

FIG. 6 shows another preferred embodiment which may be operated using a single high voltage source. In this particular embodiment all electrodes are covered by a dielectric barrier which may be beneficial for avoiding electrode erosion under severe gas conditions such as a combination of high temperature and chemical reactive gases.

The plasma may be initiated connecting terminals G1 and G2 to ground and applying repetitive alternating high voltage pulses to terminal G3. At each pulse a plasma will be formed between the electrodes 4 and 4a, covered by dielectric barriers 5 and 5a, causing a high density plasma region at the filter inlet side (7 and 8). The plasma will develop further towards electrodes 9. Again, the relative amount of plasma energy in the filter's interior per applied pulse depends on the electrical capacitance between electrode group 3 and electrode group 2 and may be further controlled by limiting the length of high voltage pulses.

The invention claimed is:

1. A system for chemically modifying material from, or suspended within, gases or fumes fed through a filter, from an inlet side of the filter to an outlet side of the filter, the system comprising:
   a first electrode system positioned at the inlet side of the filter, the first electrode system comprising a first group of electrodes located at the inlet side of the filter, the electrodes of the first group of electrodes each being covered with a dielectric barrier; and
   a second electrode system positioned at the outlet side of the filter, the second electrode system comprising a second group of electrodes located at the outlet side of the filter, the electrodes of the second group of electrodes being not covered with a dielectric barrier, and the first group of electrodes and the second group of electrodes being connected to voltage sources to facilitate applying an electric field from the inlet side of the filter to the outlet side of the filter by means of a high voltage between the first group of electrodes and the second group of electrodes,
   wherein in operation the filter being submitted to an electric plasma having a plasma density such that the plasma density of the electric plasma is maximal at the inlet side of the filter.

2. The system according to claim 1, the first electrode system comprising a third group of electrodes located at the inlet side of the filter, and
the first group, second group and third group of electrodes being connected to voltage sources to facilitate applying a high voltage between the first group of electrodes and the third group of electrodes, and applying a high voltage between the first and/or third group of electrodes and the second group of electrodes.

3. The system according to claim 2, at least two of the three electrode groups being covered by a dielectric barrier.

4. The system according to claim 1, the second electrode system comprising a plurality of relatively sharp electrodes that are not covered by dielectric barriers and have a mainly flat over-all shape.

5. The system according to claim 2, the electrodes of the third group of electrodes comprising electrodes with a relatively sharp structure and the relatively sharp structures are not covered by dielectric barriers.

6. The system according to claim 2, the electrodes of the first group of electrodes and the electrodes of the second group of electrodes being electrically interconnected.

7. The system according to claim 2, further comprising a voltage controller, the voltage controller being connected to leads for the first, second and third groups of electrodes to facilitate controlling length of voltage pulses of the high voltage applied between the third group of electrodes and the first or second groups of electrodes, respectively, to control a proportion of an amount of plasma energy dissipated in the interior of the filter compared to an amount of plasma energy dissipated at the inlet of the filter.

8. The system according to claim 1, the dielectric barriers of the first group of electrodes at the inlet side of the filter being partly embedded in a material of the filter at the inlet side of the filter and a thickness of the dielectric barrier being smaller in a first part of the dielectric barrier from the first electrodes to the filter in the material of the filter than in a second part of the dielectric barrier outside the material of the filter.

9. The system according to claim 8, the dielectric barriers having an oval shape and the electrodes having a cylindrical shape.

10. The system according to claim 1, wherein the gases or fumes comprise NO and/or $NO_2$ and the filter includes a catalytic material suitable for modifying NO and/or $NO_2$ into $N_2$ or a liquid or solid N-compound.

11. The system according claim 1, wherein the electric plasma is suitable for cleaning the filter after the surface of the filter is polluted with a deposit, precipitated by said gases or fumes on an outer surface of the filter and/or within an interior of the filter.

12. The system according to claim 2, the second electrode system comprising a plurality of relatively sharp electrodes that are not covered by dielectric barriers and have a mainly flat over-all shape.

13. The system according to claim 2, the dielectric barriers of the first group of electrodes at the inlet side of the filter being partly embedded in a material of the filter at the inlet side of the filter and a thickness of the dielectric barrier being smaller in a first part of the dielectric barrier from the first electrodes to the filter in the material of the filter than in a second part of the dielectric barrier outside the material of the filter.

14. A method for chemically modifying material from, or suspended within, gases or fumes fed through a filter, from an inlet side of the filter to an outlet side of the filter, the filter being submitted to an electric plasma having a plasma density, the method comprising:
applying an electric field, from the inlet side of the filter to the outlet side of the filter, between a first electrode system positioned at the inlet side of the filter and a second electrode system positioned at the outlet side of the filter, the first electrode system comprising a first group of electrodes located at the inlet side of the filter, the electrodes of the first group each being covered with a dielectric barrier, and the second electrode system comprising a second group of electrodes located at the outlet side of the filter, the electrodes of the second group being not covered with a dielectric barrier, the first group of electrodes and second group of electrodes being connected to voltage sources to facilitate applying the electric field from the inlet side of the filter to the outlet side of the filter by means of a high voltage between the first group of electrodes and the second group of electrodes during the applying an electric field from the inlet side of the filter to the outlet side of the filter,
wherein the plasma density of the electric plasma is maximal at the inlet side of the filter.

15. The method according to claim 14, the gases or fumes comprising NO and/or $NO_2$, and the filter includes a catalytic material suitable for modifying NO and/or $NO_2$ into $N_2$ or a liquid or solid N-compound.

16. The method according to claim 14, the electric plasma being suitable for cleaning the filter after the surface of the filter is polluted with a deposit, precipitated by said gases or fumes on an outer surface of the filter and/or within an interior of the filter.

17. The method according to claim 16, the filter being polluted with a soot deposit precipitated by said gases or fumes.

18. A system for chemically modifying material from, or suspended within, gases or fumes fed through a filter, from an inlet side of the filter to an outlet side of the filter, the system comprising:
a first electrode system positioned at the inlet side of the filter, the first electrode system comprising a first group of electrodes and a second group of electrodes located at the inlet side of the filter, wherein the electrodes of one or both of the first group and the second group are covered by a dielectric barrier, and
a second electrode system positioned at the outlet side of the filter, the second electrode system comprising a third group of electrodes located at the outlet side of the filter, the first group, second group and third group of electrodes being connected to voltage sources to facilitate applying a high voltage between the first group of electrodes and the second group of electrodes and applying an electric field from the inlet side of the filter to the outlet side of the filter by means of a high voltage between the first and/or second group of electrodes and the third group of electrodes,
wherein in operation, the filter being submitted to an electric plasma density such that the plasma density of the electric plasma is maximal at the inlet side of the filter.

19. A method for chemically modifying material from, or suspended within, gases or fumes fed through a filter, from an inlet side of the filter to an outlet side of the filter, the filter being submitted to an electric plasma having a plasma density, the method comprising:
applying an electric field from the inlet side of the filter to the outlet side of the filter between a first electrode system positioned at the inlet side of the filter and a second electrode system positioned at the outlet side of the filter, the first electrode system comprising a first group of electrodes and a second group of electrodes located at the inlet side of the filter, and the second electrode system comprising a third group of electrodes located at the outlet side of the filter, the first group, second group and third group of electrodes being connected to voltage sources to facilitate applying a high voltage between the first group of electrodes and the second group of electrodes and applying the electric field from the inlet side of the filter to the outlet side of the filter by means of a high voltage between the first and/or second group of electrodes and the third group of electrodes during the applying an electric field, wherein the plasma density of the electric plasma is maximal at the inlet side of the filter.

\* \* \* \* \*